US006357166B1

(12) United States Patent
Malmanger et al.

(10) Patent No.: US 6,357,166 B1
(45) Date of Patent: Mar. 19, 2002

(54) ROD HOLDER

(75) Inventors: John A. Malmanger, Seattle, WA (US); Mikal B. Greaves, Mountain View, CA (US)

(73) Assignee: Tempress Products L.L.C., Carrollton, TX (US)

( * ) Notice: Subject to any disclaimer, the term of this patent is extended or adjusted under 35 U.S.C. 154(b) by 0 days.

(21) Appl. No.: 09/617,407

(22) Filed: Jul. 17, 2000

(51) Int. Cl.[7] ............................................... A01K 97/10
(52) U.S. Cl. ...................................................... 43/21.2
(58) Field of Search .......................... 43/21.2; 248/515; D22/147

(56) References Cited

U.S. PATENT DOCUMENTS

| | | | | |
|---|---|---|---|---|
| 4,807,384 A | * | 2/1989 | Roberts, Sr. .................... | 43/17 |
| 4,827,654 A | * | 5/1989 | Roberts ........................ | 43/21.2 |
| D307,170 S | | 4/1990 | Scott .......................... | D22/147 |
| 5,121,565 A | * | 6/1992 | Wille et al. ................... | 43/4 |
| 5,142,809 A | * | 9/1992 | O'Brien et al. ................ | 43/21.2 |
| 5,231,785 A | * | 8/1993 | Roberts ....................... | 43/21.2 |
| 5,313,734 A | * | 5/1994 | Roberts ....................... | 43/21.2 |
| 5,321,904 A | * | 6/1994 | Benson ........................ | 43/21.2 |

FOREIGN PATENT DOCUMENTS

| | | |
|---|---|---|
| CA | 59224 | 8/1987 |

OTHER PUBLICATIONS

U.S. design application Ser. No., 29/126,433, John A. Malmanger, et al., filed Jul. 17, 2000.

* cited by examiner

Primary Examiner—Charles T. Jordan
Assistant Examiner—Jordan Lofdahl
(74) Attorney, Agent, or Firm—Fulbright & Jaworski L.L.P.

(57) ABSTRACT

The present invention provides a passive restraint system and method for a variety of implements, such as a fisherman's rod assembly, adapted to allow rapid extraction of the implement from the restraint system. A preferred embodiment of the present invention utilizes a retaining member configured to provide a substantially spiral groove to result in a side exit of a retained rod when operated in a otherwise useful motion, such as a hook setting motion of a fisherman's rod. Preferred embodiments also include the use of resilient closures to provide an incarceration force which may easily be overcome in a typical use situation, but which are sufficient to discourage unwanted release or removal of an implement from a holder of the present invention.

104 Claims, 3 Drawing Sheets

ROD HOLDER

RELATED APPLICATIONS

This application is related to concurrently filed, and commonly assigned U.S. patent application Ser. No. [056136-D007US-10003709] entitled "ROD HOLDER," the disclosure of which is hereby incorporated herein by reference.

TECHNICAL FIELD

The present invention relates to the controlled retaining of an object in a desired orientation and, more specifically, to systems and methods for retaining a sporting implement, such as a fisherman's rod, in a ready position.

BACKGROUND

The number of sporting activities available to individuals during their leisure time has continued to proliferate in recent years. Accordingly, manufacturers and other entities serving sports enthusiasts have striven to provide products and services specifically adapted for use in such sporting activities. Often such products must be specially adapted to provide desired attributes for use according to the particular sporting activity.

For example, in the sport of fishing, equipment must be adapted to accommodate not only the gross weight of the fish to be caught, but also adapted to tolerate other considerations such as the wet environment in which the equipment will be used. Additionally, such equipment should be adapted for the preferred steps utilized in luring a fish onto a line, i.e., the casting of the line, the holding of a fishing rod in anticipation of a fish strike, and the movements of the setting of a hook in the fish, in addition to the stresses and movements associated with landing a fighting fish.

In addressing the fisherman's or anglers needs for a system to adequately support a fishing rod assembly, i.g., a rod and reel combination, both in transit and during use, various rod holder apparatus have been developed. For example, in a simple form, a rod holder may be provided by a tube assembly, such as might be made of metal or plastic, of suitable size and depth to accommodate the grip portion of a fishing rod extending below the point at which the reel is attached. Such a tube may be mounted vertically, such as on a boat gunwale, bulkhead, or console, to hold a rod assembly in a substantially vertical orientation during transport. Additionally or alternatively, such a tube may be mounted at an angle, such as protruding over a boat gunwale or transom, to hold a rod assembly in a diagonal orientation, typically with the rod tip extended beyond the side of the boat, during use.

However, such a simple rod holder typically suffers from undesirable traits. For example, in order to accept many of the newer style rods, such as those presenting a "trigger" appendage on the grip portion, the tube may require modification, such as enlarging the diameter of the tube a sufficient amount to accept such an appendage. However, enlargement of the tube's diameter generally results in a rather loose fit with a rod is inserted for holding, thus allowing an undesired level of lateral movement therein. Additionally, a simple tube configuration typically relies upon the distal end of the tube to abut a portion of the rod assembly, such as the rear surface of the reel. This can result in damage to an often expensive equipment in addition to interfering with various mechanisms, such as spool release and/or drag adjustment mechanisms.

Moreover, such a design does not accommodate the sudden rod drawing motion often required to set a hook when a fish strikes. Accordingly, although only having seconds to complete the proper movements after a strike, the angler must extract the rod assembly from the tube, often requiring movement in the direction of the fish causing undesired slack in the fishing line, in order to free the rod assembly from the tubular rod holder in order to free the assembly for a hook setting drawing motion.

It should be appreciated that, although providing sufficient incarceration of the rod assembly to preclude the necessary operation of the assembly, the simple tube often does not provide sufficient incarceration of the rod assembly to prevent its unwanted migration or extraction from the holder. For example, the bouncing movement of a boat could cause a rod assembly to "walk" sufficiently that the grip portion may become disengaged from the tube. Additionally, tension on the fishing line, such as from a fish strike or even the resistance of a lure in water during trolling, may present the proper forces to partially or fully extricate the rod assembly from the rod holder.

More complicated rod holder designs have been implemented to present systems addressing some of the problems of the more simple designs, such as the simple tube described above. For example, a locking rod holder design employing a channel, a cuff, and a rod lock mechanism has been used in the past.

In this design, the channel provides support to a portion of the rod assembly, such as providing a bottom surface upon which the rod or grip rests and/or side walls upon which the reel rests. The channel may include an opening to accommodate irregularities on the underside of the rod assembly.

The cuff is typically disposed on the rear of the rod holder and presents a retaining surface, fully enclosing a portion of the channel, disposed to prevent the rod assembly from being lifted straight out of the channel. Typically the surface of the lower portion of the channel terminates at or before the cuff in order to permit the pivoting of the rod assembly therein, such as to accommodate the drawing motion of hook setting.

The rod locking mechanism is typically disposed on the front of the rod holder and is adjustable to incarcerate a portion of the rod assembly within the channel. For example, a typical rod locking mechanism is a ring having a gap therein disposed around the channel. This ring may be rotated such that the gap therein corresponds to the opening in the top of the channel in order to allow ingress and egress of the rod assembly. However, once the ring is rotated, the rod assembly is incarcerated within the confines defined by the channel to the bottom and sides, the cuff to the rear top, and the ring to the front top.

The locking rod holder provides improvement over the simple tube type rod holder in that, when the rod locking mechanism is engaged, the rod assembly is generally sufficiently restricted in movement to prevent its unwanted migration or extraction from the holder. Moreover, the design of such a rod holder may be configured to support the rod assembly without causing significant damage thereto and/or without undesirably engaging mechanisms thereon.

However, the locking rod holder has not fully addressed the problems in the prior art discussed above. For example, although allowing the rod assembly to be drawn in a hook setting motion, once the locking mechanism is released, the locking rod holder requires additional effort to extract the rod assembly from the rod holder for further fishing action.

Specifically, although allowing the rod to pivot in the rod holder, the cuff and channel continue to incarcerate the grip portion of the rod assembly when the hook setting motion is complete preventing its free movement and requiring an additional upward motion to fully extricate the assembly from the rod holder. This extraction motion is in addition to the time and motion required in releasing the locking mechanism in order to allow the hook setting motion, each of which consume time during an activity in which time is often critical.

Accordingly, a need exists in the art for a system and method for disposing an implement, such as a fishing rod assembly, in a desired orientation and for reliably maintaining the implement in such orientation up to such time as it is desired to reorient the implement.

A further need exists in the art for such systems and methods to allow for the disposal of the implement into a desired orientation with a minimal amount of manipulation and/or time. Similarly, a need exists in the art for such systems and methods to allow for the reorientation of the implement, such as the removal of the implement from a restraining mechanism, with a minimal amount of manipulation and/or time.

SUMMARY OF THE INVENTION

These and other objects, features and technical advantages are achieved by a system and method which utilizes a passive restraint system adapted to allow the normal use activity of the implement to extricate it from the restraint system, while reliably incarcerating the implement otherwise. A preferred embodiment of the present invention adapted as described above is embodied in a passive restraint fishing rod holder having a channel, a retaining member, and a boot to retain a fishing rod assembly in an orientation substantially coaxial to the channel until such time as it is desired to extricate the rod assembly from the rod holder.

According to the preferred embodiment, the channel provides support to a portion of the rod assembly, such as providing a bottom surface upon which the rod or grip rests and/or side walls upon which the reel rests. A most preferred embodiment includes adaptation of the side walls to present a detent or other structure, such as ridges, grooves, reliefs, and/or protrusions, to provide support to a reel without causing damage thereto. Additionally or alternatively, the channel may include an opening or other adaptation, such as detents, ridges, grooves, reliefs, and/or protrusions, to accommodate irregularities on the underside of the rod assembly, such as trigger appendages on the grip, reel mounting apparatus, etcetera.

The retaining member of the preferred embodiment, in addition to providing a structure which incarcerates a rod assembly when disposed in the channel, provides a means of egress and/or ingress operable when the rod assembly is in a position other than that at which it is to be retained. According to a most preferred embodiment of the present invention, the retaining member is disposed on the rear of the rod holder and presents a side entry opening adapted to allow the grip portion of the rod assembly to pass laterally when the rod assembly is not disposed coaxially with the channel.

A preferred embodiment of the retaining member is adapted to present a leading edge surface disposed to encourage proper movement into/out of the channel by the rod assembly. The preferred embodiment of the channel is adapted to present a corresponding trailing edge surface disposed to encourage proper movement into/out of the channel by the rod assembly. For example, according to a most preferred embodiment of the present invention the leading edge surface of the retaining member and the trailing edge surface of the channel define a spiral groove which encourages the rod assembly out of the channel as the rod assembly is drawn in a hook setting motion.

The boot of the preferred embodiment provides a resilient channel closure to provide a desired level of resistance to the passing of a portion of the rod assembly into/out of the channel. For example, according to a most preferred embodiment of the present invention, the boot is disposed on the front of the rod holder and provides a finger or fingers movably closing a portion of the channel. By adapting/adjusting the resilience of the fingers according to the present invention, a desired level of incarceration is provided to thereby allow a rod assembly to pass into and/or out of the channel when desired and to incarcerate the rod assembly within the channel in typical operating conditions. Additionally or alternatively, by properly shaping/disposing the fingers according to the present invention, a desired level of incarceration may be provided to allow a rod assembly to pass into and/or out of the channel without causing undesired effects such as snagging of fishing line etcetera.

Accordingly a technical advantage of the present invention is provided in that an implement, such as a fishing rod assembly, is disposed and retained in a desired orientation up to such time as it is desired to reorient the implement.

A further technical advantage is provided in that the disposal of the implement into a desired orientation is accomplished with a minimal amount of manipulation and/or time.

A still further technical advantage is provided in that extrication of the implement is accomplished with a minimal amount of manipulation and/or time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

The present invention utilizes a passive restraint system to provide simplified removal of an implement held therein.

For example, a most preferred embodiment of the present invention is adapted to allow the normal use activity of a sporting implement to extricate it from the restraint system, while reliably incarcerating the sporting implement otherwise. In order to better aid the reader in understanding the concepts of the present invention, its use is described herein with respect to a preferred embodiment fishing rod holder. However, it should be appreciated that the present invention is useful in a number of embodiments in addition to that specifically described herein. For example, one of ordinary skill in the art will readily appreciate that the present invention configured substantially as described herein with respect to the preferred embodiment may be utilized to hold any number of objects at the ready, such as gaffs, booms, oars, pole nets, etcetera.

Moreover, it should be appreciated that the present invention is not limited to use with sporting equipment. Indeed, the present invention may be utilized to reliably retain for ready access and simple removal any number of items. For example, the present invention may be utilized to retain emergency equipment on a service vehicle for quick and easy removal by emergency personnel, such as to retain a pry bar on a fire truck for quick access by a fireman.

Figure 1:
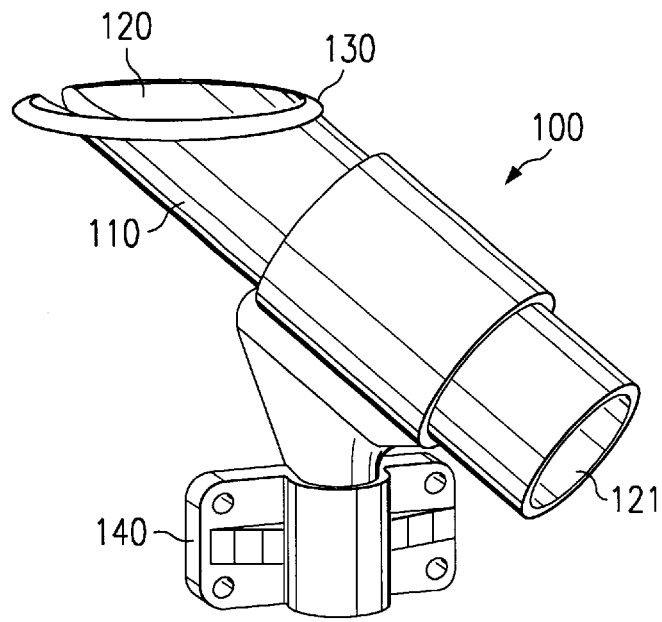
FIG. 1 shows a prior art tubular rod holder.

In understanding the features and advantages of the present invention, it is helpful to reference prior art apparatus. Directing attention to FIG. 1, a prior art tubular rod holder, such as might be made of metal or plastic of suitable size and depth to accommodate the grip portion of a fishing rod, is shown generally as tubular rod holder 100. Tubular rod holder 100 includes tubular body 110 having opening 120 to accept a portion of the rod assembly to be held, such as the grip portion of a rod assembly. Opening 121 may also be included to allow a portion of the rod assembly to protrude beyond body 110 when the rod assembly is being held by tubular rod holder 100. Butt 130, such as may be provided by a lip portion of body 110, is disposed to provide a surface upon which a portion of the rod assembly may rest, such as to prevent further migration into body 110.

Tubular rod holder 100 may include mounting apparatus such as mounting bracket 140, which may be fixed or adjustable. Depending upon the mounting apparatus utilized, and the adjustment thereof, tubular rod holder 100 may be mounted vertically, to hold a rod assembly in a substantially vertical orientation, or at another angle, such as to hold the rod assembly in a diagonal orientation.

Figure 2:
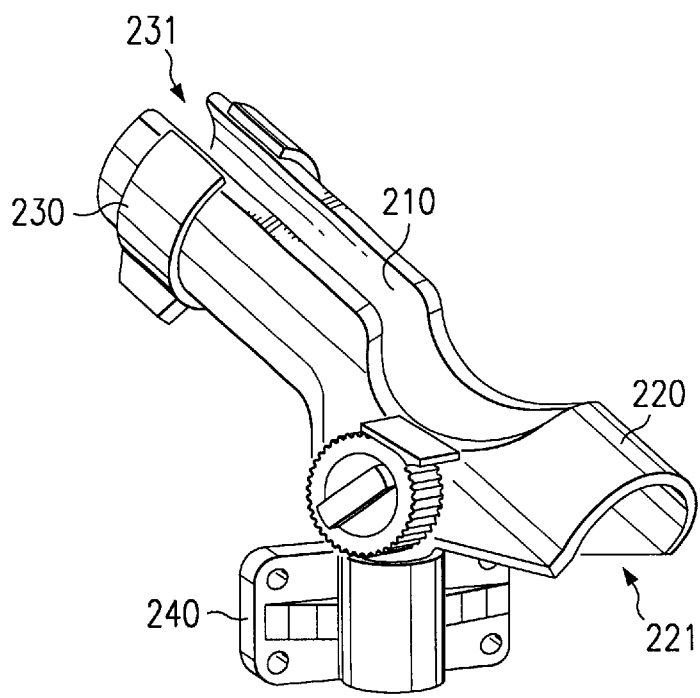
FIG. 2 shows a prior art locking rod holder.

A prior art locking rod holder 200 is shown generally in FIG. 2. As can be seen in FIG. 2, the locking rod holder design employs channel 210, cuff 220, and locking ring 230. Channel 210 is substantially tubular in shape and provides support to a portion of the rod assembly, such as providing a bottom surface upon which the rod or grip rests and/or side walls upon which the reel rests. Cuff 220 is disposed on the rear of locking rod holder 200 and presents a retaining surface, fully enclosing a portion of channel 210, disposed to prevent the rod assembly from being lifted straight out of channel 210. The surface of the lower portion of channel 210 terminates at cuff 220 in order to provide pivot opening 221. Locking ring 230 is disposed on the front of locking rod holder 200 and is adjustable to incarcerate a portion of the rod assembly within the channel. Specifically, locking ring 230 includes a gap portion which when properly aligned with channel 210 presents opening 231 to allow passage of a portion of the rod assembly. Locking ring 230 may then be rotated on channel 210 to incarcerated the rod assembly.

Locking rod holder 200, like tubular rod holder 100 described above, may include mounting apparatus such as mounting bracket 240, which may be fixed or adjustable. Depending upon the mounting apparatus utilized, and the adjustment thereof, locking rod holder 200 may be mounted vertically, to hold a rod assembly in a substantially vertical orientation, or at another angle, such as to hold the rod assembly in a diagonal orientation.

It should be appreciated from the above that the prior art rod holder apparatus present either a rod holding solution which is limited in its ability to retain a rod assembly and rod holders which require several motions to remove the rod assembly therefrom. The present invention addresses these deficiencies in the prior art by providing a rod holder incorporating a passive restraint system adapted to allow the normal use activity of the rod assembly to extricate it from the restraint system, while reliably incarcerating the rod assembly when desired.

Figure 3:
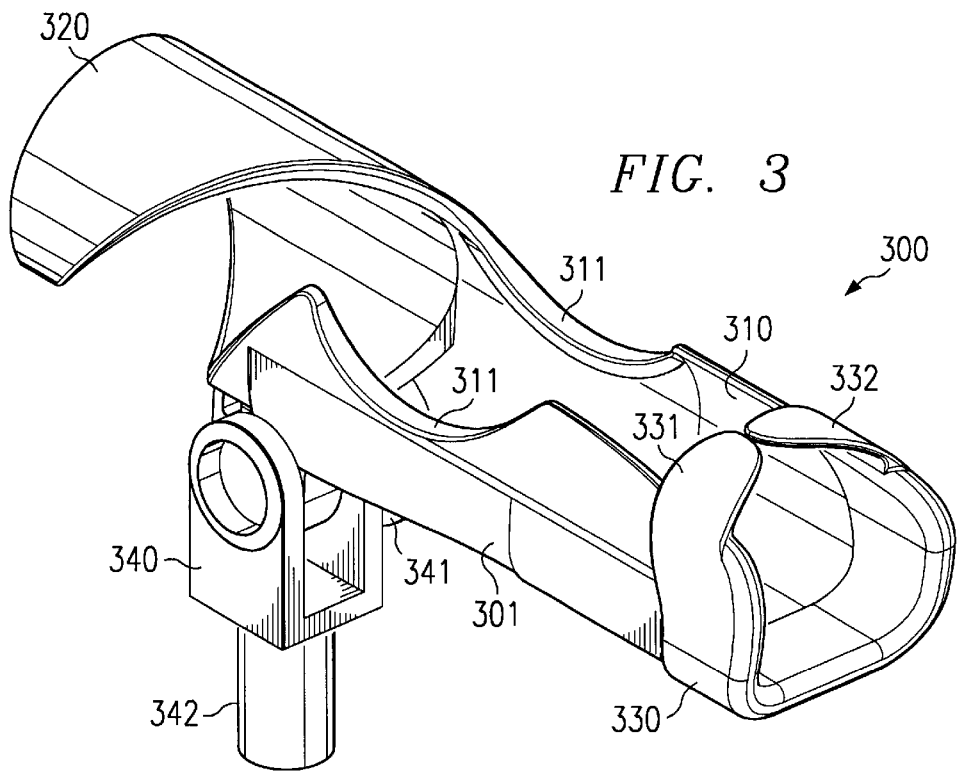
FIGS. 3 and 4 show a preferred embodiment rod holder according to the present invention.
Figure 4:
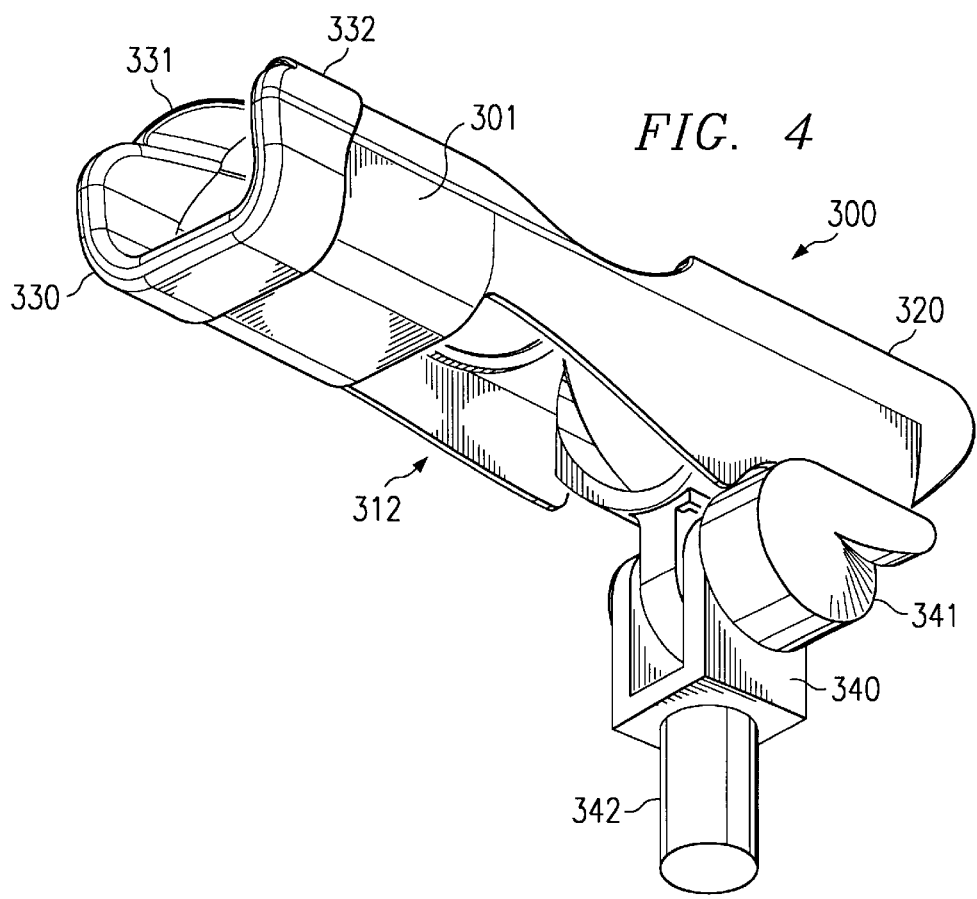

A preferred embodiment of a fishing rod holder adapted according to the present invention is shown generally as passive restraint rod holder 300 in FIGS. 3 and 4. Passive restraint rod holder 300 includes body 301, providing channel 310 and retaining member 320, boot 330, providing fingers 331 and 332, and mounting assembly 340, providing adjustment mechanism 341 and interface member 342.

Also shown in the preferred embodiment of FIG. 3 are saddles 311 and opening 312. According to a preferred embodiment, saddles 311 are adapted to provide a surface upon which a reel portion of a fishing rod assembly may rest. Accordingly, contact between a rod portion and/or grip portion of the held rod assembly and passive restraint rod holder 300 may be minimized because of suspension of the rod assembly within channel 310 when a reel rests in saddles 311. Similarly, opening 312 (FIG. 4) provides an orifice through which protrusions from the rod assembly may be accommodated. For example, many modem fishing rods include a finger grip "trigger" protrusion extending from the rod in a direction opposite that of the fishing line reel disposed thereon. Additionally or alternatively, opening 312 may accommodate mechanisms utilized in attaching the reel to the fishing rod. Opening 312 provides additional advantages to the preferred embodiment passive restraint rod holder in that an orifice for the rapid draining of any liquids that might enter channel 310, such as due to splashing of water associated with the movement of a boat in which the holder is mounted. Moreover, the inclusion of opening 312 allows for a reduction in the use of materials, and their associated weight, in manufacturing passive restraint rod holder 300.

Saddles 311 are shown in the preferred embodiment extending slightly inward from the sidewalls of body 301. This is preferred embodiment provides an increased surface upon which a reel may rest and, therefore, minimizes any chance for damage to an often expensive item of sporting equipment. Of course, the saddles of the present invention may be altered, such as to increase their surface area, decrease their surface area, or omit them entirely from passive restraint rod holder 300. For example, saddles 311 may be made to extend further into channel 310 in order to provide a more pronounced ledge upon which a reel may rest, such as to accommodate smaller reels. Saddles 311 may be made to extend outward from body 301 in addition to or in the alternative to their extension into channel 310 as shown. Of course, saddles 311 may be formed as detents in the sidewalls of body 301 without any extension thereof, if desired. The most preferred embodiment of passive restraint rod holder 300 adapts saddles 311 to present as little opportunity for snagging fishing line as possible, such as by minimizing the amount of extension included and/or tapering or otherwise configuring the surfaces to discourage snagging.

It should be appreciated that various combinations of the above described components of passive restraint rod holder 300 and/or variations upon the above components of passive restraint rod holder 300 may be utilized according to the present invention. For example, body 301 may be configured so as to omit the formation of channel 310 and instead rely upon boot 330 and/or retaining member 320 to provide lateral support for a retained rod. Additionally or alternatively, retaining member 320 may be a component separate from body 301 or omitted, if desired. Similarly, boot 330 may be formed integrally with body 301 or omitted, if desired.

It should be appreciated that the use of a particular mounting assembly is not a limitation of the present invention. Mounting assembly 340 is illustrated to show a typical adjustable mounting assembly employing adjustment mechanism 341 to engage ratchet teeth (not shown) to allow desired adjustment of an angle of body 301 with respect to interface member 342. Interface member 342 may rotatably engage a sleeve (not shown), such as may be securely mounted on or in a surface, to thereby rotatably and/or removably interface passive restraint rod holder 300 to an environment, such as a boat. Of course other mounting techniques may be utilized, including fixed mounts, such as may employ fasteners removably or substantially permanently engaging passive restraint rod holder 300 to an environment, and adjustable mounts, including mounts with or without an adjustment mechanism, such as a gimbal mount.

It is envisioned that the preferred embodiment passive restraint rod holder of FIGS. 3 and 4 will be utilized in wet and even corrosive environments, i.e., disposed on a boat exposed to salt or brackish water spray. Accordingly, the preferred embodiment utilizes materials such as thermoplastics to form body 301, retaining member 320, boot 330, and/or mounting assembly 340. Of course other materials may be utilized according to the present invention, such as ceramics, metals, and various resins.

A most preferred embodiment of the present invention utilizes polypropylene in forming body 301, retaining member 320, and components of mounting assembly 340. Polypropylene is utilized according to the most preferred embodiment because of its suitability to use in injection molding techniques, its ability to be configured for use in particular applications, such as through the use of fillers, opacifying agents, colourants, impact modifiers, ultra-violet inhibitors, etcetera, and its strength and ability to retain its shape after initial forming.

A most preferred embodiment of the present invention utilizes thermoplastic urethane (TPU) in forming boot 330. TPU is utilized according to the most preferred embodiment because of its resiliency characteristics, in addition to its suitability to use in injection molding techniques as described above with respect to the use of polypropylene. As will be better appreciated in light of the description provided below, boot 330 provides a closure in channel 310 which does not require additional user intervention to open or close in order to allow an object such as a rod assembly portion to pass there through. Accordingly, boot 330, or at least a portion thereof, such as fingers 331 and 332, is preferably comprised of a material which provides a level of resiliency such that fingers 331 and 332 normally are retained in a position to present a closure of channel 310. Additionally, the resiliency of this material preferably allows fingers 331 and 332 to deflect a sufficient amount with a desired amount of pressure to allow an object such as a rod assembly portion to pass there through when desired.

Of course other materials may be utilized in providing fingers 331 and 332 having desirable characteristics. For example, where a greater resistance to removal of the rod assembly is desired, such as where large sport fish are sought, boot 330 and/or fingers 331 and 332 may be made of the above mentioned polypropylene or similar more rigid material. Other materials useful in providing a passive restraint according to the present invention, depending upon the particular restraint characteristics desired, include rubber, neoprene, plastic, and the like.

In adapting the boot of the present invention to provide the above described desired attributes, various parameters are preferably considered. For example, the derometer of the material is preferably selected to provide a particular material flexibility. Additionally the dimensions of the boot, or portions thereof, may be sized and/or shaped to provide a desired level of resiliency. According to a preferred embodiment of the present invention, the boot material is selected to provide a durometer to be within the range of 30 to 70 on the durometer share A scale, most preferably being approximately 65 on the A scale, with the thickness of the fingers being within the range of 0.040 to 0.175 of an inch, most preferably being approximately $\frac{1}{16}$th of an inch, and a width within the range of 0.5 to 1.25 of an inch, most preferably being approximately $\frac{3}{4}$ of an inch.

Referring still to FIGS. 3 and 4, fingers 331 and 332 of boot 330 can be seen to substantially fully close a portion of channel 310. However, alternative embodiments of the present invention may provide a gap between fingers 331 and 332, such as might be slightly smaller than the diameter of the smallest rod anticipated to be incarcerated by boot 330. Alternatively, fingers 331 and 332 may overlap, such as to ensure full closure of channel 310.

Fingers 331 and 332 adapted as described above allow sufficient deflection from the relaxed state illustrated to allow an object, such as a rod assembly portion to pass into and out of channel 310 when a proper force is applied to the object. For example, a rod assembly may be disposed such that a grip portion extends below retaining member 320 and a portion of the rod shaft is disposed above fingers 331 and 322. By application of a downward force, the rod may be pivoted into channel 310 by deflecting fingers 331 and 332 as the rod shaft passes between.

Once disposed within channel 310, fingers 331 and 332 preferably relax to the state illustrated in FIGS. 3 and 4 to once again close channel 310. Accordingly, the rod assembly will be retained, preferably with a reel assembly resting upon saddles 311, within channel 310 until such time as the appropriate upward force is applied to pivot the rod in the opposite direction, again deflecting fingers 331 and 332 as the rod shaft passes between.

In the preferred embodiment fingers 331 and 332 only close a portion of channel 310 as this has been determined to provide a sufficient incarceration to hold a fishing rod under typical conditions experienced in use, including the bouncing associated with rough water and the forces associated with trolling and fish strikes. Of course other configurations may be utilized according to the present invention. For example, the fingers may be widened to cover a larger portion of channel 310. Additionally or alternatively a plurality of fingers may be utilized on one or each side of the channel, such as one set of fingers at the front of the channel and another set of fingers towards the middle of the channel. Likewise other configurations of fingers may be utilized, such as the use of a plurality of bristle like fingers, staggering the fingers of either side of the channel to provide an interleaved interface of the fingers, and the like. Moreover, it should be appreciated that the use of an even number of fingers is not necessary according to the present invention. For example, a configuration of three fingers staggered as described above, such as to provide additional incarceration force on the stern side of passive restraint rod holder 300 used in trolling in a boat deployment, may be utilized according to the present invention. Similarly, one or more fingers extending substantially across the full width of channel 310 may be utilized, if desired.

Figure 5:
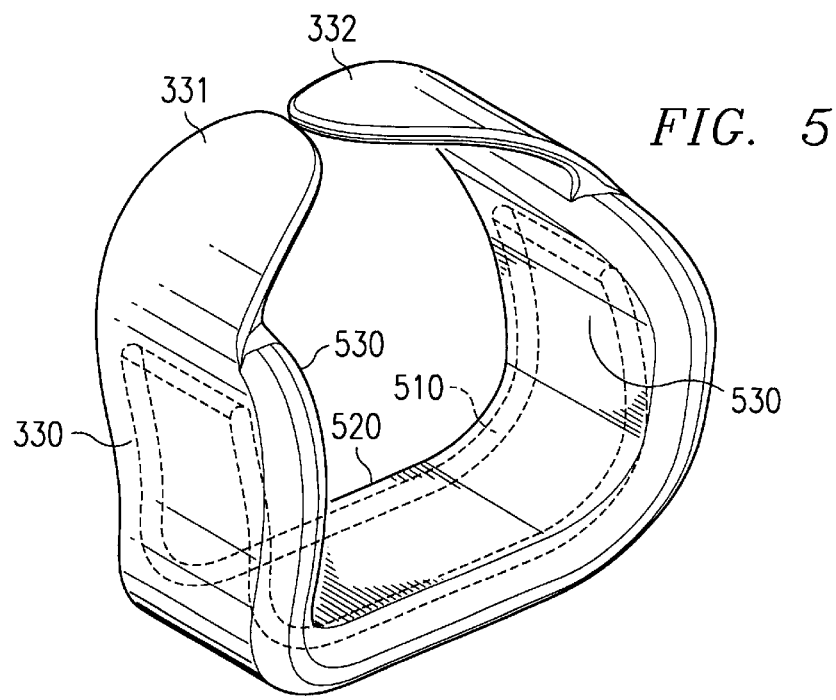
FIG. 5 shows a preferred embodiment passive restraint boot of the present invention.

Directing attention to FIG. 5, boot 330 of the preferred embodiment is illustrated having been removed from body 301. Shown in FIG. 5 is slit 510 adapted to receive a portion of body 301 and thereby dispose boot 330 upon body 301 as illustrated in FIGS. 3 and 4. Accordingly, the preferred embodiment of the present invention provides an easy means by which boot 330 may be removed and replaced, such as to replace a finger damaged or destroyed in use. Moreover, removal and replacement of boot 330 may be utilized to provide variously configured boots, such as ones providing a greater incarceration force, ones having various sized gaps/overlaps, or even ones made of a material or treated with a material for particular applications, e.g. to protect a particular finish on a rod or to satisfactorily operate in a particular temperature range.

In the most preferred embodiment body 301 is adapted to present a ridge corresponding to the size and shape of boot 330 in order to present a substantially smooth and flush composite surface on the exterior when body 301 is engaged in boot 330. Such a smooth surface is preferred both for aesthetic reasons as well as to provide less of an opportunity for items such as fishing line to snag on uneven surfaces. However, alternative embodiments may omit this ridge if desired.

In contrast, according to the most preferred embodiment body 301 is not adapted to result in a substantially smooth composite surface with boot 330 on the interior of channel 310, i.e., inside bottom surface 520 and inside side surfaces 530 are preferably not flush with the corresponding inside surfaces of body 301. This configuration is preferred in order to present a somewhat soft raised receiving surface upon which an item such as a rod rests upon when held by passive restraint rod holder 300. Moreover, such a raised portion of the area within passive restraint rod holder 300 presents a reduced surface upon which a rod held within passive restraint rod holder 300 will rest. However, alternative embodiments may provide a ridge as discussed above, if desired.

It should be appreciated that slit 510 of boot 330 is but one embodiment which may be utilized to couple boot 330 to body 301. Although the use of slit 510 is preferred because it presents a readily removable interface, having a sufficient amount of friction to prevent unwanted disengaging without further fastening means, it should be appreciated that additional or alternative fastening means may be employed. For example, boot 330 may be substantially permanently interfaced with body 301 through the application of an adhesive on either or both of body 301 and boot 330. Less permanent interfacing of boot 330 with body 310 may be accomplished through such techniques as providing locking nips and corresponding detents, ridges, and/or the like, to provide resistance to removal. Moreover, slit 510 may be omitted if desired, such as in favor of the use of fasteners, including adhesives, screws, bolts, rivets, and/or the like.

It shall be appreciated that boot 330 provides closure of only a portion of channel 310 according to the preferred embodiment of FIGS. 3 and 4. Retaining member 320 is disposed over channel 310 to work in combination with boot 330 of the preferred embodiment to incarcerate a portion of the implement to be held. Specifically, in the preferred embodiment where a fishing rod is to be held, retaining member 320 is disposed over a portion of channel 310 such that a grip portion of a typical rod assembly is disposed under retaining member 320 when the rod assembly is disposed with a reel assembly resting upon saddles 311 and a portion of the rod shaft disposed below fingers 331 and 322. In this orientation, i.e., the rod being disposed longitudinally in channel 310, retaining member 320 operates in combination with channel 310 to provide surfaces preventing the removal of the rod from the holder in all directions except coaxial with channel 310.

Figure 6:
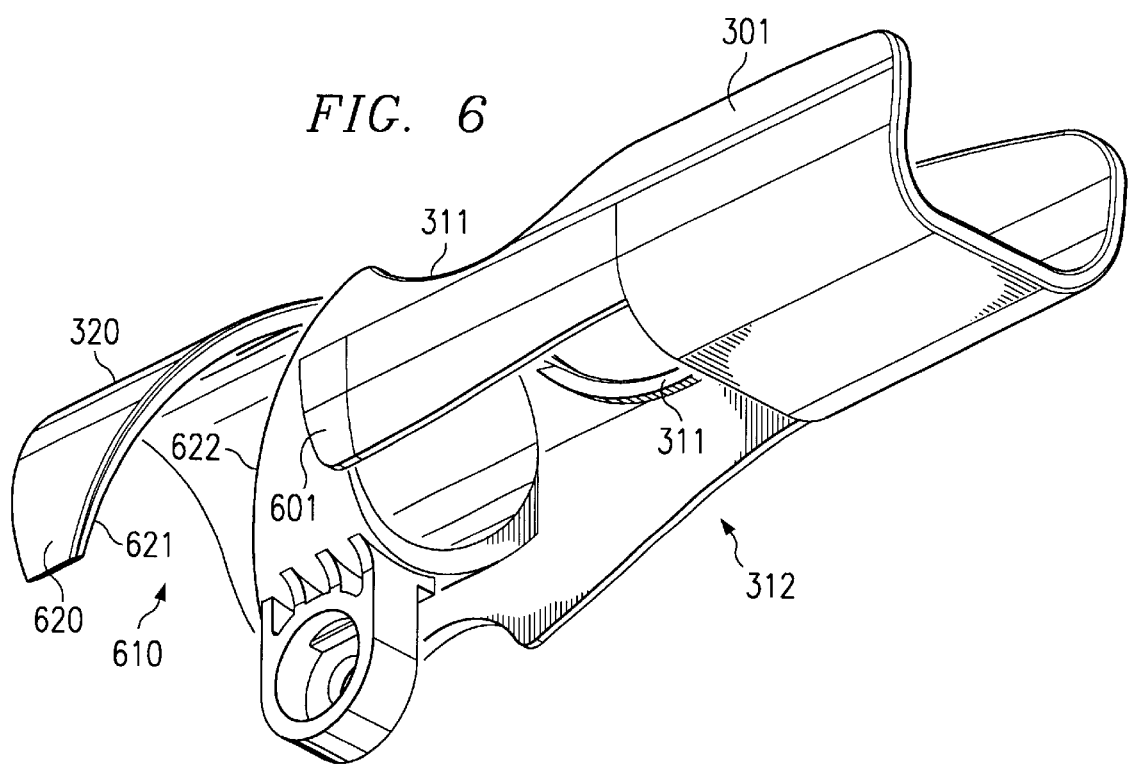
FIG. 6 shows a preferred embodiment body assembly of a rod holder of the present invention having a retaining member integral therewith.

The cooperation between retaining member 320 and the surfaces of channel 310 are more easily visible in the illustration of FIG. 6. Specifically, it can readily be seen in FIG. 6 that retaining member 320 truncates in flange 620 extending a length sufficiently great to correspond to sidewall 601 of channel 310, i.e., of sufficient length to configure the remaining gap to prevent the passing of a particular portion of the rod assembly there through when oriented coaxially with channel 310. Therefore, although gap 610 is provided between the distal end of retaining member 320 and sidewall 601, lateral movement of a rod incarcerated in passive restraint rod holder 300 is prevented when disposed coaxially in channel 310. According to a most preferred embodiment of the present invention, flange 620 extends not only a sufficient distance to correspond with sidewall 601, but extends slightly beyond the mid-point of sidewall 601 to ensure that a held item is not inadvertently removed from passive restraint rod holder 300.

Coaxial removal of a rod is discouraged by a reel portion of the rod assembly being unable to pass rearward through retaining member 320. Additionally or alternatively, rearward movement of the rod assembly may be discouraged by a trigger portion of the rod assembly experiencing restriction of movement associated with opening 312. Similarly, coaxial removal of the rod is discouraged by the resistance to the reel portion of the rod assembly passing forward through the fingers of boot 330 and/or a trigger portion of the rod assembly experiencing restriction of movement associated with opening 310. Moreover, it should be appreciated that the use of a fishing rod within passive restraint rod holder 300 is expected to be to be used in fishing activities. Accordingly, it is expected that a fishing line will be deployed with sufficient weight thereon and/or with sufficient forces applied thereto, such as associated with the drag associated with tolling or a fish on the line, to cause a portion of the rod assembly at the front of passive restraint rod holder 300 to be pressed firmly against inner surfaces of boot 330. Such pressure on the resilient material of boot 330 of the preferred embodiment may be relied upon to provide a coefficient of friction to discourage coaxial removal of the rod assembly. This friction coefficient may be relied upon alone or in combination with the above described removal discouraging means according to the present invention.

It should be appreciated that the preferred embodiment of retaining member 320 is adapted to provide leading edge 621. According to the preferred embodiment leading edge 621 is adapted to encourage the exit of a rod assembly held by passive restraint rod holder 300 under predetermined conditions. For example, leading edge 621 of retaining member 320 of the embodiment of FIG. 6 is provided in a "spiral" configuration. Accordingly, where a fishing rod is held such that a grip portion is disposed under retaining member 320, when the distal end of the rod assembly is raised, i.e., as a portion of the rod shaft disposed below fingers 331 and 322 is moved upward through fingers 331 and 332 while a grip portion of the rod assembly remains disposed below retaining member 320, a top surface of the rod assembly grip portion engages leading edge 621. Due to spiral adaptation of leading edge 621, the pressure of the top surface of the rod assembly grip portion resulting from continued upward movement of the distal end of the rod assembly results in the grip portion of the rod assembly being encouraged to move toward, and ultimately through gap 610. Accordingly, it should be appreciated that the normal use of such a rod assembly, i.e., hook setting motion, results in the extraction of the rod assembly from passive restraint rod holder 300.

The preferred embodiment of passive restraint rod holder 300 shown in FIG. 6, body 301 is also adapted to provide a "spiral" trailing edge 622. According to the preferred embodiment, leading edge 621 and trailing edge 622 are correspondingly adapted to cooperate to encourage the exit of a rod assembly held by passive restraint rod holder 300. For example, the pitch of the spiral of leading edge 621 and trailing edge 622 may be substantially the same, although inversed, in order to provide a surface which engages a bottom surface of the rod assembly grip portion to encourage movement of the rod assembly toward gap 610, in addition to or in the alternative to the above mentioned encouragement provided by leading edge 621.

There is no requirement according to the present invention that the pitch of the spiral, or amount of taper, of the leading edge and the trailing edge be substantially the same. It may be desired to provide a slightly lower pitch (a slower spiral) with respect to leading edge 621 as compared to trailing edge 622 to produce a desired effect on the movement of the held item, such as the distal end of a fishing rod to move more or less rapidly laterally than the rod assembly itself. For example, by altering the pitch of the spiral of leading edge 611 with respect to trailing edge 612, if the top surface of the grip portion engages leading edge 611 while the bottom surface of the grip portion engages trailing edge 612, a yaw action may be inspired in the rod's motion. Additionally or alternatively, slight differences in taper may be provided for other purposes, such as to aid in manufacturing, such as where injection die cast molding techniques are utilized in order to simplify die design and/or removal.

The pitch of the spirals, or acuteness of the angles of spiral, of leading edge 621 and/or trailing edge 622 are preferably selected based on any or a combination of parameters. For example, the less tapered the spiral, i.e., the closer to orthogonal to the sidewalls the leading and trailing edges are, the less a force will be provided to encourage the exit of the rod assembly from the rod holder. However, the more tapered the spiral, i.e., the closer to parallel to the sidewalls the leading and trailing edges, the more a force will be provided to encourage the exit of the rod assembly from the rod holder.

Moreover, according to the preferred embodiment, the leading and/or trailing edges help define the gap through which the held item exits the holder of the present invention. Accordingly, selection of the angels at which these edges are tapered will, according to this embodiment, in part define the attitude at which the rod assembly is orientated when exiting the passive restraint rod holder. It has been determined that an angle of approximately 45° is a natural angle at which the hook setting motion of a fishing pole is concluded and, therefore, is a desirable angle at which to provide gap 610.

Accordingly, a preferred embodiment of passive restraint rod holder 300 utilizes a configuration of leading edge 621 and trailing edge 622 to provide gap 610 adapted to allow passage of the grip portion of a rod assembly at approximately 45°.

It should be appreciated that the distance between leading edge 621 and trailing edge 622 defines a width of gap 610 through which items, such as the above mentioned grip portion of a rod assembly, may pass. Accordingly, in addition to selecting the pitch of the leading edge and trailing edges as described above, the preferred embodiment of the present invention includes consideration of a sufficient distance between these two edges in order to accommodate an expected size of object. For example, the width of gap 610 may be selected to be of sufficient size to accommodate a largest expected rod assembly grip, which will also accommodate smaller rod assembly grips. Alternatively, the width of gap 610 may be selected to specifically accommodate a particular size of item, such as a particular rod assembly grip diameter. In such a case multiple embodiments of passive restraint rod holder may be provided, each specifically adapted for a particular size of item. Alternatively, restraining member 320 may be adjustable to allow selection of a currently desired width of gap 610. For example, restraining member 320 may be movably mounted on body 301, such as by a sliding mechanism or a series of selectable fastening positions, to thereby allow a user to adjust the distance between leading edge 621 and trailing edge 622 and, thus, adjust the width of gap 601.

In operation according to the preferred embodiment of the present invention, leading edge 621 and/or trailing edge 622 engage a portion of a rod assembly held by passive restraint rod holder 300 when removing the rod assembly therefrom. However, often the rod assemblies are quite expensive and may be easily damaged. For example, often the grip portion of a rod assembly is covered in cork or foam to provide a comfortable and secure grip for the angler. However, such substances might be easily damaged by a sharp surface. Accordingly, the preferred embodiment leading edge 621 and trailing edge 622 are adapted to provide a smooth surface to engage the rod assembly. For example, a most preferred embodiment of leading edge 621 and trailing edge 622 are provided as a half round when viewed in a cross section.

The provision of leading edge 621 and/or trailing edge 622 in a suitably tapered cross section presents difficulty when utilizing injection mold die casting. Specifically, die cast mold cavities must be provided with draft, i.e., cavity angles which are at all points are greater than 90° or not "under cut," in order to prevent die lock, the inability to separate the mold dies once the die cast object has been formed. Accordingly, in a typical mold design, either the cross sectional taper of the edges would be required to terminate as a somewhat sharp edge at either the top surface or the bottom surface or a parting line would necessarily be present in the center of the cross section of these edges. The flashing associated with the parting line often itself results in a small sharp edge. As described above, a sharp edge on the leading and trailing edge is undesirable according to a preferred embodiment because of damage that might result to an item coming in contact therewith.

Accordingly, a most preferred embodiment of the present invention utilizes a rotating core mold design to dispose a core providing the full half round cross section to the leading and/or trailing edges without a parting line appearing on the edges. Relying upon the spiral design of the leading and trailing edges, this rotating core can be "unscrewed" from the molded body without further adaptation of the preferred embodiment design. For example, an A half injection mold, having a cavity or cavities associated with the upper half of body 301, and a B half injection mold, having a cavity or cavities associated with the lower half of body 301 may be mated and a core or cores inserted there between in order to provide the void of channel 310 within body 301. In the preferred embodiment illustrated, a first core half may be inserted from the front of the mated A and B cavity halves to provide the front squared portion of channel 310. A second core half may be inserted from the rear of the mated A and B cavity halves to provide the rounded portion of channel 310 and retaining member 320. The half round taper of leading edge 621 and trailing edge 622 may be provided by this second core half, which is removable from within cast body 301 by rotating the core during extraction. This molding technique is synergistic with respect to the inventive retaining member design of the present invention to provide a superior apparatus which may be manufactured in mass quantities efficiently.

It should be appreciated that the preferred embodiment of the present invention presents a passive restraint rod holder which is somewhat squared at the front end while being rounded at the rear. The use of a rounded rear section is advantageous in providing the spiral leading and trailing edge surfaces adapted to encourage the exit of the rod assembly from the rod holder as well as to accommodate the above described rotating core injection mold design. The squared front portion of the preferred embodiment rod holder provides an aesthetically pleasing design configuration as well as providing corner areas into which a portion of a rod may rest, and therefore be held steadily, when in use.

The diameter of the rear portion of the preferred embodiment rod holder is preferably selected to both accommodate a desired range of diameters of a portion of a rod assembly to be disposed therein and a reel seat portion of the rod assembly to be disposed therein. Additionally or alternatively, the diameter of the rear portion of the rod holder is selected to substantially correspond to a desired separation of sidewalls of body 301 and, therefore, saddles 311. The selection of separation of sidewalls and the saddles is preferably based at least in part on a separation sufficient to accommodate a wide variety of reels, allowing the rod upon which they are disposed to pass between the sidewalls, wile providing support for both sides of the reel with the saddles to retain the rod assembly with the reel in a substantially horizontal orientation. According to a preferred embodiment, the diameter of the rear portion of a rod holder is selected to be approximately 2.125 inches (most preferably 2.15 inches ±0.375 of an inch with a sidewall separation of approximately 2 inches (most preferably 2 inches ±0.375 of an inch to accommodate the most commonly used sizes of sport fishing casting rod assemblies, such as might be utilized in bass, crappie, and trout fishing. A preferred embodiment rod holder body of the present invention is configured such that the sidewalls are separated 2.125 inches at the front of the rod holder (preferably having a sidewall height of 1.75 inches) and a rear diameter of 2.25 inches.

It should be appreciated that exit of the rod assembly from the passive restraint rod holder of the preferred embodiment results in lateral movement of the rod assembly. According to a preferred embodiment, this lateral movement is provided in a desired direction. Specifically, where passive restraint rod holder 300 is deployed on the side of a boat for use in trolling, gap 610 is preferably oriented toward the bow of the boat (it being appreciated that the illustrated rod holder would be utilized on the port side of the boat and a mirror image rod holder embodiment utilized for the starboard side of the boat according to this preferred embodiment). Accordingly, the motion of setting the hook when trolling additionally moves the rod assembly forward in the boat, providing additional motion in a direction generally opposing that of the fish and line (due to the forward motion of the trolling the line and fish will generally be toward the aft of the boat). As such, the lateral motion of the rod assembly resulting from its exit from the rod holder of the present invention is utilized to ensure no slack appears in the fishing line and/or to supplement the hook setting motion.

As suggested above, the preferred embodiment passive restraint rod holder may be provided in various configurations adapted to provide lateral motion in a particular direction. It should be appreciated that separate embodiments are not required in order to provide these multiple configurations. For example, a single body portion of passive restraint rod holder 300 may be provided with a removable rear portion, including retaining member 320, in order to enable selection of a desired configuration.

Moreover, it should be appreciated that various combinations of the features of the preferred embodiment of the present invention may be utilized or not as desired. For example, a restraining member of the present invention may be utilized without a channel closure boot of the present invention, such as where a locking ring at the front end of a rod holder as described above is desired. Similarly, a channel closure boot of the present invention may be utilized without a restraining member of the present invention, such as where a cuff at the rear of a rod holder as described above is desired.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An implement restraining system comprising:
    a channel to accommodate at least a portion of an implement to be restrained, said channel having a first end and a second end, said channel also having a channel opening extending substantially from said first end and said second end;
    at least one resilient member disposed at a first position located toward said first end adapted to substantially close said channel opening at said first position and thereby restrict egress from said channel at said first position by a portion of said implement; and
    at least one retaining member disposed at a second position located toward said second end adapted to leave a gap in said channel opening, wherein said gap is adapted to allow passing of a portion of said implement in a predetermined orientation there through.

2. The system of claim 1, wherein said implement is a fishing rod assembly.

3. The system of claim 1, wherein said channel is at least in part provided by a body assembly.

4. The system of claim 4, wherein said body assembly is formed of injection molded polypropylene.

5. The system of claim 3, wherein said body assembly is shaped differently at said first end and said second end of said channel.

6. The system of claim 5, wherein said body assembly is substantially squared at said first end and is substantially circular at said second end.

7. The system of claim 3, wherein said body assembly comprises two sidewall sections.

8. The system of claim 7, wherein at least one of said sidewall sections includes a saddle section, wherein said saddle section is adapted to interface with a portion of said implement and thereby provide support for said implement when restrained by said system.

9. The system of claim 3, wherein said body assembly comprises a second opening disposed in juxtaposition with at least a portion of said channel opening, wherein said second opening is adapted to accommodate a portion of said implement protruding beyond said channel when said implement is restrained by said system.

10. The system of claim 1, wherein said at least one resilient member comprises at least two fingers extending from sides of said channel opening into said channel opening.

11. The system of claim 10, wherein said at least two fingers are disposed in juxtaposition on opposite sides of said channel opening and each extends approximately half way into said channel opening to thereby cooperate in substantially closing said channel opening.

12. The system of claim 10, wherein said at least two fingers are disposed in staggered positions on opposite sides of said channel opening and each extends approximately half way into said channel opening to thereby cooperate in substantially closing said channel opening.

13. The system of claim 1, wherein said resilient member is comprised of thermoplastic urethane.

14. The system of claim 1, wherein said resilient member is adapted to provide a desired amount of resistance associated with egress of said implement from said channel.

15. The system of claim 14, wherein said desired amount of resistance is provided at least in part through selection of a material of said resilient member, selecting a thickness of said resilient member, and selecting a width of said resilient member.

16. The system of claim 14, wherein said desired amount of resistance is selected at least in part with respect to a particular activity said implement is to be used in.

17. The system of claim 14, wherein said desired amount of resistance is selected at least in part with respect to environmental conditions said implement is to be used in.

18. The system of claim 1, further comprising:
a boot adapted for disposal at said first position, wherein said boot comprises said at least one resilient member.

19. The system of claim 18, wherein said boot is adapted for disposal within said channel at said first position to provide a raised resilient lining within said channel at said first position in addition to providing said at least one resilient member at said first position.

20. The system of claim 18, wherein said boot is selected from a plurality of boots adapted for disposal at said first position.

21. The system of claim 20, wherein said boot is removably disposed within said channel to thereby provide for replacement of said boot by another one of said plurality of boots.

22. The system of claim 21, wherein ones of said plurality of boots are suitable for replacement of said boot to provide substantially the same characteristics of said boot.

23. The system of claim 21, wherein ones of said plurality of boots are suitable for replacement of said boot to provide a choice of characteristics of a boot disposed in said channel.

24. The system of claim 23, wherein said characteristics of said plurality of boots are adapted for various configurations of implements to be restrained by said system.

25. The system of claim 1, wherein said at least one retaining member comprises:
a leading edge adapted to encourage movement of a portion of said implement through said gap as another portion of said implement is moved past said at least one resilient member.

26. The system of claim 25, wherein said leading edge presents a predetermined pitch substantially corresponding to said predetermined orientation at which said implement passes through said gap.

27. The system of claim 26, wherein said leading edge is adapted to provide a substantially smooth surface.

28. The system of claim 27, wherein said smooth surface is a radiused cross section having no parting line disposed thereon.

29. The system of claim 25, further comprising:
a body having a portion thereof disposed in juxtaposition with said retaining member.

30. The system of claim 29, wherein said body comprises a trailing edge adapted to cooperate with said leading edge to encourage movement of a portion of said implement through said gap as another portion of said implement is moved past said at least one resilient member.

31. The system of claim 30, wherein the pitch of said leading edge and a pitch of said trailing edge are substantially the same.

32. The system of claim 30, wherein the pitch of said leading edge and a pitch of said trailing edge are selected to be different.

33. The system of claim 32, wherein the difference in the pitch of said leading edge and the pitch of said trailing edge is selected to encourage a desired behavior in said implement during removal from said system.

34. The system of claim 1, wherein said gap is oriented to result in a side exit of said implement from said system.

35. The system of claim 34, wherein a particular side for said side exit is selected to provide a lateral movement of said implement in a desired direction during use.

36. The system of claim 34, wherein said system is adapted to allow selection of a particular side of said side exit.

37. The system of claim 36, wherein selection is accomplished through selection of a particular retaining member of a plurality of retaining members utilized with said system.

38. A rod holder comprising:
a body, said body configured to form a channel sized and shaped to accommodate at least a portion of a rod assembly;
at least one resilient finger disposed at a first position with respect to said body, wherein said at least one resilient finger is disposed to substantially enclose said channel at said first position; and
a substantially rigid retaining member disposed at a second position with respect to said body, wherein said retaining member is disposed to enclose said channel at said second position except for a predetermined gap to allow passing of a portion of said implement in a predetermined orientation there through, wherein said predetermined orientation is other than said rod being coaxial with said channel.

39. The rod holder of claim 38, wherein said body is formed of injection molded polypropylene.

40. The rod holder of claim 38, wherein said body is substantially squared at said first position.

41. The rod holder of claim 38, wherein said body is substantially circular at said second position.

42. The rod holder of claim 38, wherein said body comprises two sidewall sections, and wherein each of said sidewall sections includes a saddle adapted to interface with a portion of said rod assembly.

43. The rod holder of claim 42, wherein said body includes an opening disposed in juxtaposition with said saddles, wherein said opening is adapted to accommodate a trigger portion of said rod assembly.

44. The rod holder of claim 38, wherein said resilient finger is comprised of thermoplastic urethane.

45. The rod holder of claim 38, wherein said resilient finger is comprised of a material selected from the group consisting of:
   polypropylene;
   polyvinyl chloride;
   polystyrene;
   polyurethane; and
   polythene.

46. The rod holder of claim 38, further comprising:
   at least a second resilient finger, wherein said at least one resilient finger and said at least a second resilient finger cooperate to substantially enclose said channel.

47. The rod holder of claim 46, wherein said at least one resilient finger and said at least a second resilient finger are disposed in juxtaposition on opposite sides of said channel at said first position.

48. The rod holder of claim 46, wherein said at least one resilient finger and said at least a second resilient finger are disposed in a staggered arrangement on opposite sides of said channel.

49. The rod holder of claim 38, wherein said resilient finger is adapted to provide a desired amount of resistance associated with removal of said rod assembly selected at least in part with respect to a particular activity said implement is to be used in.

50. The rod holder of claim 38, wherein said resilient finger is adapted to provide a desired amount of resistance associated with removal of said rod assembly selected at least in part with respect to environmental conditions said implement is to be used in.

51. The rod holder of claim 38, wherein said at least one resilient finger is disposed on a carrier coupled to said body.

52. The rod holder of claim 51, wherein said carrier comprises:
   a boot adapted for disposal at said first position.

53. The rod holder of claim 52, wherein said boot comprises:
   a slot sized and shaped to accept a portion of said body.

54. The rod holder of claim 52, wherein said body includes a ridge on a surface external to said channel to provide a substantially smooth composite surface when said portion of said body is fully interfaced with said slot of said boot.

55. The rod holder of claim 53, wherein said boot provides a raised resilient membrane on a surface internal to said channel to provide a receiving surface when said portion of said body is fully interfaced with said slot of said boot.

56. The rod holder of claim 51, wherein said carrier including said resilient finger is one of a plurality of carriers including resilient fingers adapted for use with said body.

57. The rod holder of claim 56, wherein ones of said carrier and resilient finger combinations are suitable for use in replacing a damaged carrier and resilient finger combination to thereby provide to said rod holder substantially same characteristics.

58. The rod holder of claim 56, wherein ones of said carrier and resilient finger combination are suitable for use in replacing other ones of said carrier and resilient finger combinations to thereby provide to said rod holder selected different characteristics.

59. The rod holder of claim 38, wherein said retaining member comprises:
   a flange adapted to encourage movement of a portion of said rod assembly through said gap as another portion of said rod assembly is removed from said channel.

60. The rod holder of claim 59, wherein said flange comprises:
   a leading edge shaped to present a predetermined spiral pitch.

61. The rod holder of claim 60, wherein said predetermined spiral pitch substantially corresponds to said predetermined orientation at which said implement passes through said gap.

62. The rod holder of claim 60, wherein said leading edge is adapted to provide a substantially smooth surface.

63. The rod holder of claim 62, wherein said smooth surface is a radiused cross section having no parting line disposed thereon.

64. The rod holder of claim 59, further comprising:
   an abutment surface adapted to cooperate with said flange to encourage movement of a portion of said rod assembly through said gap as another portion of said rod assembly is removed from said channel.

65. The rod holder of claim 38, wherein said gap is oriented to result in a side exit of said rod assembly from said rod holder.

66. The rod holder of claim 65, wherein a particular side for said side exit is selected to provide a lateral movement of said rod assembly in a desired direction during use.

67. A system for providing substantially passive restraint to a rod assembly disposed in a rod holder apparatus, said system comprising:
   a boot body adapted to interface with a portion of said rod holder, said boot body configured to define a acceptance and release orifice; and
   a pair of deformable protrusions disposed on said boot body on opposite sides of said orifice to thereby cooperate to provide a deformable closure for at least a portion of said orifice.

68. The system of claim 67, wherein said pair of deformable protrusions is comprised of thermoplastic urethane.

69. The system of claim 68, wherein said boot body is comprised of thermoplastic urethane.

70. The system of claim 67, wherein said boot body comprises:
   a slot sized and shaped to accept said portion of said rod holder apparatus.

71. The rod holder of claim 70, wherein said boot body is adapted to provide a raised receiving surface on an internal surface of said rod holder assembly.

72. The system of claim 67, wherein said pair of deformable protrusions are disposed in juxtaposition on said opposite sides of said orifice and each extends approximately half way into said orifice.

73. The system of claim 72, wherein said pair of deformable protrusions are disposed in staggered positions on said opposite sides of said orifice and each extends approximately half way into said orifice.

74. The system of claim 67, wherein said boot body is shaped to provide at least a bottom surface and two side surfaces.

75. The system of claim 74, wherein said boot body provides corner areas in the transition between said bottom surface and said two side surfaces.

76. The system of claim 74, wherein said boot body is at least semi-circular, wherein said two side surfaces and said bottom surface are portions of said semi-circular boot body configuration.

77. A system for providing substantially passive restraint to a rod assembly disposed in a rod holder apparatus, said system comprising:
 a retaining flange disposed on said rod holder in a predetermined orientation to thereby provide a gap of predetermined characteristics, wherein said retaining flange is configured to encourage movement of a portion of said rod assembly through said gap when said rod assembly is pivoted in said rod holder.

78. The system of claim 77, wherein said flange comprises:
 a leading edge shaped to present a predetermined spiral pitch.

79. The system of claim 78, wherein said predetermined spiral pitch substantially corresponds to at least one characteristic of said predetermined characteristics of said gap.

80. The system of claim 79, wherein said at least one characteristic is an orientation at which said rod assembly is disposed when a portion thereof passes through said gap.

81. The system of claim 78, wherein said leading edge is adapted to provide a substantially smooth surface.

82. The system of claim 81, wherein said smooth surface is a radiused cross section having no parting line disposed thereon.

83. The system of claim 77, further comprising:
 an abutment surface adapted to cooperate with said retaining flange to encourage movement of a portion of said rod assembly through said gap when said rod assembly is pivoted in said rod holder.

84. The system of claim 83, wherein said abutment surface comprises:
 a trailing edge shaped to present a predetermined spiral pitch.

85. The system of claim 84, wherein said predetermined spiral pitch substantially corresponds to at least one characteristic of said predetermined characteristics of said gap.

86. The system of claim 85, wherein said at least one characteristic is an orientation at which said rod assembly is disposed when a portion thereof passes through said gap.

87. The system of claim 84, wherein said trailing edge is adapted to provide a substantially smooth surface.

88. The system of claim 87, wherein said smooth surface is a radiused cross section having no parting line disposed thereon.

89. A method of providing substantially passive holding of an implement, said method comprising:
 providing a holder having a deformable channel closing device, a retaining member, and a side exit gap associated with said retaining member;
 disposing a portion of the implement below said retaining member;
 pivoting said implement to engage said deformable channel closing device to thereby deform said channel closing device and pass by said deformable channel closing device into said channel; and
 allowing said deformable channel closing device to relax and thereby provide closure of said channel while said implement is disposed therein.

90. The method of claim 89, further comprising:
 pivoting said implement to engage said deformable channel closing device to thereby deform said channel closing device and pass by said deformable channel closing device out of said channel and to engage said retaining member to thereby guide said implement through said gap during said pivoting.

91. The method of claim 89, further comprising:
 providing said retaining member with a spiral configuration leading edge to provide a continuous surface to engage said implement and to conduct said implement through said gap.

92. The method of claim 91, further comprising:
 providing a spiral configuration trailing edge associated with said gap to provide a continuous surface to engage said implement and to conduct said implement through said gap.

93. The method of claim 89, further comprising:
 selecting said deformable channel closing device from a plurality of deformable channel closing devices.

94. The method of claim 89, further comprising:
 selecting a particular side for said side exit gap based at least in part on a desired direction of travel for said implement when removed from passive holding.

95. A method of providing substantially passive holding of an implement, said method comprising:
 providing a holder having a deformable channel closing device, a retaining member, and a side exit gap associated with said retaining member; and
 pivoting said implement to engage said deformable channel closing device to thereby deform said channel closing device and pass by said deformable channel closing device out of said channel and to engage said retaining member to thereby guide said implement through said gap during said pivoting.

96. The method of claim 95, further comprising:
 providing said retaining member with a spiral configuration leading edge to provide a continuous surface to engage said implement and to conduct said implement through said gap.

97. The method of claim 96, further comprising:
 providing a spiral configuration trailing edge associated with said gap to provide a continuous surface to engage said implement and to conduct said implement through said gap.

98. The method of claim 95, further comprising:
 selecting a particular side for said side exit gap based at least in part on a desired direction of travel for said implement when removed from passive holding.

99. A method of making a rod holder, said method comprising:
 providing a retaining member in association with a channel to incarcerate at least a portion of said rod;
 providing a groove having a predetermined substantially spiral configuration on at least a first side of said groove, wherein said first side of said groove is at least in part defined by a surface of said retaining member, and wherein said substantially spiral configuration of said groove is adapted to encourage movement of said incarcerated at least a portion of said rod from incarceration by said retaining member when said rod is moved in a predetermined manner while incarcerated by said rod holder.

100. The method of claim 99, wherein said groove also has a predetermined substantially spiral configuration on a second side of said groove, wherein said second side of said groove is at least in part defined by a surface of a body of said hod holder.

101. The method of claim 99, wherein said spiral configuration is adapted to provide a side exit from said rod holder.

102. The method of claim 101, wherein side exit comprises a gap disposed at approximately a 45° angle with respect to said channel.

103. The method of claim 99, further comprising:
providing a resilient finger in association with said channel to incarcerate at least a portion of said rod.

104. A rod holder made according to the steps of:
molding a rod holder body using a rotating core die cast mold assembly, wherein a substantially spiral groove adapted to provide a side exit from said rod holder by a rod retained therein is formed by a rotating core portion of said rotating core die case mold assembly; and rotating said core portion of said rotating core die case mold assembly during extraction of said core from said molded rod holder body, wherein said substantially spiral groove is relied upon in accomplishing the removal of said rotating core after molding of said rod holder body in said die case mold assembly.

* * * * *